Aug. 27, 1957     L. S. GREENLAND     2,804,084
PRESSURE SENSITIVE DEVICE
Filed Jan. 26, 1955 ized Aug. 27, 1957

United States Patent Office 2,804,084
Patented Aug. 27, 1957

2,804,084
PRESSURE SENSITIVE DEVICE

Leonard Sidney Greenland, Compton, Wolverhampton, England, assignor to H. M. Hobson Limited, London, England, a British company Application January 26, 1955, Serial No. 484,217

Claims priority, application Great Britain March 10, 1954

5 Claims. (Cl. 137—115)

This invention relates to Mach number control units for use in aircraft or other airborne vehicles, that is to say to units which are inactive below a predetermined Mach number but effective to impart movement to a member when a predetermined Mach number is attained.

A known form of Mach number control unit, described in United States application Ser. No. 402,355, filed January 5, 1954, comprises two concentric bellows, arranged to act jointly on the member to be moved, and exposed externally to static pressure, $P_s$, the outer bellows being evacuated and the inner bellows being exposed internally to ram pressure, $P_t$. The ratio $$\frac{P_t}{P_s}$$

is a unique function of Mach number and in the arrangement described in United States application Ser. No. 402,355 the outer bellows tends to maintain a valve closed on a seating and the control unit is effective to open the valve when a Mach number is attained at which $$\frac{P_t}{P_s} = \frac{A_4}{A_3}$$

where $A_3$ and $A_4$ are respectively the effective areas of the inner and outer bellows. The Mach number control unit may, however, as in the case of the units described in United States application Ser. No. 458,334, filed September 27, 1954, now Patent No. 2,788,185, be initially out of contact with the member to be moved and arranged to contact and move the member when the predetermined Mach number is attained.

I have found it difficult to obtain accurately the desired Mach number setting due to the variations within the dimensional tolerances present in this form of construction, and the present invention provides an improved Mach number control unit which is readily adjustable to vary the Mach number at which it will become active.

The unit according to the invention comprises a housing, a conduit for supplying air at ram pressure $P_t$ to the interior of said housing through a restriction, a second restriction permitting of flow of air from said housing so that the air pressure within the housing is a fraction, $kP_t$, of ram pressure, $k$ being a constant predetermined by the restrictions, one of said restrictions being adjustable to vary the value of the constant $k$, and a pair of rigidly coupled and opposed pressure sensitive devices of unequal areas disposed within the housing, the smaller pressure sensitive device being evacuated and subject externally to partial ram pressure $kP_t$ and the larger pressure sensitive device being subject to static pressure $P_s$ in the direction tending to maintain the unit inactive and subject to the pressure $kP_t$ in the opposing direction. As explained in more detail below the unit will become active to move the associated member when the force exerted by the pressure $kP_t$ on the unbalanced area of the larger pressure sensitive device exceeds the opposing force exerted by the pressure $P_s$ on said pressure sensitive device. Adjustment of the unit may therefore readily be effected by adjustment of the restriction and therefore of the value of $k$.

One embodiment of the invention, for use in a fuel supply system for an airborne vehicle propelled by an engine, will now be described by way of example with reference to the accompanying drawing.

Figure 1:
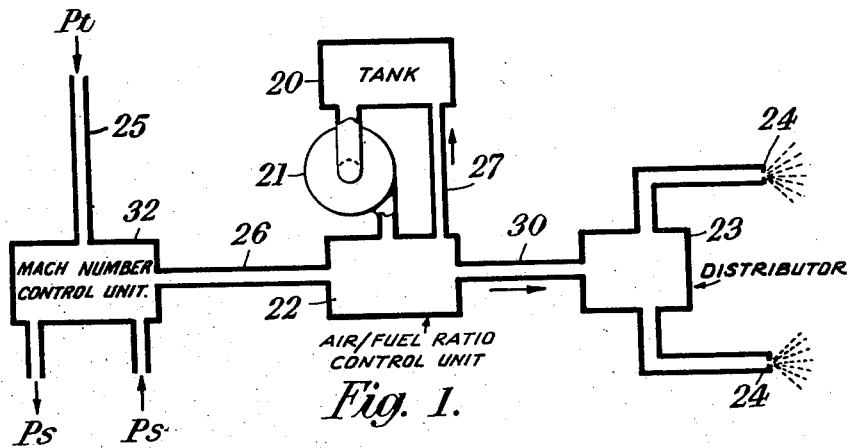
Fig. 1 is a block diagram of the fuel supply system.

The fuel supply system shown in Fig. 1 comprises a tank 20, a centrifugal pump 21, an air/fuel ratio control unit 22, a Mach number control unit 32 and a distributor 23. Fuel is pumped by the pump 21 from the tank 20 to the air/fuel ratio control unit 22 and thence, via a pipe 30 and the distributor 23 to the burners 24 of the combustion turbine or ram jet engine.

Figure 2:
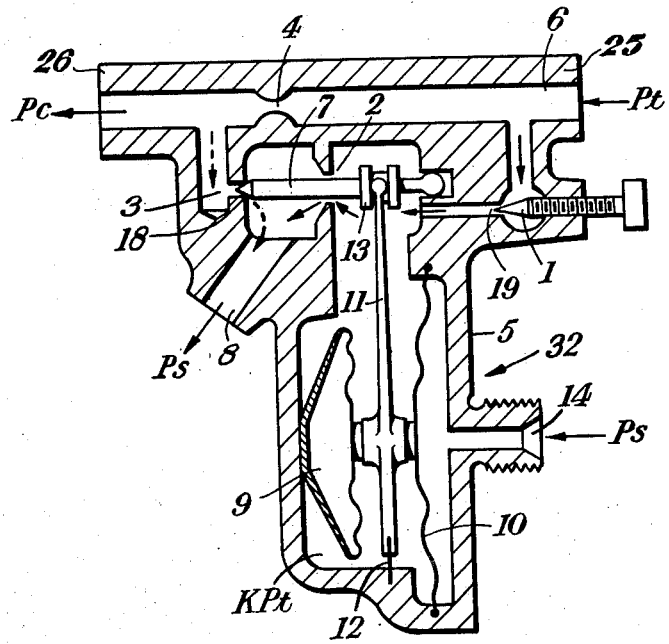
Fig. 2 is a vertical section through the Mach number control unit.

The air/fuel ratio control unit 22, which is described in detail in United States application Ser. No. 402,355, serves to meter the fuel supplied to the burners 24 in accordance with changes in the ram pressure at the entry to the air duct to the engine, this pressure being supplied to the unit 22 by a signal line 25, 26, including a section 6 which traverses the Mach number control unit 32 as indicated in Fig. 2. A spill line 27 returns to the tank 20 the fuel used as a servo medium in the unit 22 and taken from the main supply of fuel delivered by the pump 21. Alternatively the spill line 27 may discharge the return from the unit 22 overboard or into the pipe 30. The servo medium is used to maintain the rate of flow of fuel to the engine through the pipe 30 proportional to the gas pressure in the conduit 26. The unit 32 is ineffective at low Mach numbers but serves, as later described, at high Mach numbers to modify the gas pressure signal to the unit 22 in the sense to reduce the fuel flow to the engine.

The Mach number control unit 32 comprises, as shown in Fig. 2, a housing 5, the interior of which communicates by way of a restriction 19, controlled by an adjustable needle 1, with the signal line 6 by which ram (total) pressure $P_t$ is supplied to the air/fuel ratio control unit 22. The line 6 contains a restriction 4 and the pressure $P_c$ downstream of the restriction 4 determines the rate of flow of fuel to the engine as already described. Air can flow out of the housing 5 through a restriction 2 and an outlet 8 communicating with static pressure $P_s$, and the air pressure within the housing is a fraction, $kP_t$, of ram pressure, $P_t$, determined by the adjustment of the needle 1.

The Mach number control unit reduces the flow of fuel to the engine when a predetermined Mach number is attained by opening a normally closed valve 7, as will now be described, to permit air to flow from the line 6, at a point downstream of the restriction 4, to the outlet 8 through the restriction 3 produced by the valve 7 and its seat 18.

The housing 5 contains an evacuated capsule 9 and a diaphragm 10 which are rigidly connected together and attached to a lever 11, pivoted to the housing at 12 and coacting with a collar 13 on the valve 7. The right hand side of the diaphragm 10 is subject to static pressure, $P_s$, applied thereto by an inlet 14. Due to the rigid coupling between the capsule 9 and the diaphragm 10, the effect of pressure $kP_t$ acting on the evacuated capsule 9 is counterbalanced by the same pressure acting on an equal area of the diaphragm 10. Consequently the area of the evacuated capsule neutralises an equal area of the diaphragm 10 with respect to pressure $kP_t$. Over the remaining or unbalanced area of the diaphragm 10 the pressure $kP_t$ produces a force tending to open the valve 7. In the direction towards closure of the valve 7 the static pressure $P_s$ is effective over the full area of the diaphragm 10. If $A_1$ and $A_2$ are respectively the areas of the capsule 9 and the diaphragm 10, the force tending to open the valve 7 will be $kP_t(A_2-A_1)$ and the force tending to close it will be $P_sA_2$. When the predetermined Mach number is obtained, these forces will be equalised provided that there is no residual spring force in the assembly at the valve-closed position.

Under this condition $kP_t(A_2-A_1)=P_sA_2$ or $$\frac{P_t}{P_s}=\frac{A_2}{k(A_2-A_1)}$$

The critical Mach number at which the unit will become active to reduce the fuel flow to the engine is therefore determined by the ratio $$\frac{A_2}{k(A_2-A_1)}$$

which can readily be adjusted by altering the setting of the needle 1.

What I claim as my invention and desire to secure by Letters Patent is:

1. For use in an airborne vehicle, apparatus sensitive to Mach number and arranged to impart movement to a member when a predetermined Mach number is attained, said apparatus comprising an inlet for entry of a stream of air at ram pressure to the interior of said housing, a restriction associated with said inlet, an outlet for permitting said stream of air to flow from said housing, a restriction associated with said outlet, means for adjusting the effective area of one of said restrictions and thereby varying the pressure of said airstream in the interior of the housing, an evacuated capsule within said housing and exposed to the pressure of said airstream, a pressure-sensitive device of larger area than said capsule also disposed within said housing and having a surface facing said capsule exposed to the pressure of said airstream and a surface remote from said capsule exposed to static air pressure, and means rigidly coupling said capsule to said pressure-sensitive device.

2. For use in an airborne vehicle, apparatus sensitive to Mach number and arranged to impart movement to a member when a predetermined Mach number is attained, said apparatus comprising an inlet for entry of a stream of air at ram pressure to the interior of said housing, a restriction associated with said inlet, an outlet for permitting said stream of air to flow from said housing, a restriction associated with said outlet, means for adjusting the effective area of one of said restrictions and thereby varying the pressure of said airstream in the interior of the housing, an evacuated capsule within and attached to said housing and exposed to the pressure of said airstream, a diaphragm of larger area than said capsule also disposed within said housing and having a surface facing said capsule exposed to the pressure of said airstream and a surface remote from said capsule exposed to static air pressure, and means rigidly coupling said capsule to said diaphragm.

3. For use in an airborne vehicle, apparatus sensitive to Mach number and arranged to impart movement to a member when a predetermined Mach number is attained, said apparatus comprising an inlet for entry of a stream of air at ram pressure to the interior of said housing, a restriction associated with said inlet, an outlet for permitting said stream of air to flow from said housing, a restriction associated with said outlet, means for adjusting the effective area of one of said restrictions and thereby varying the pressure of said airstream in the interior of the housing, an evacuated capsule within said housing and exposed to the pressure of said airstream, a pressure-sensitive device of larger area than said capsule also disposed within said housing and opposed to said capsule, said pressure-sensitive device having a surface facing said capsule exposed to the pressure of said airstream and a surface remote from said capsule exposed to static air pressure, and a lever within said casing pivoted at one end to said casing and having opposite surfaces fixed respectively to said capsule and to said pressure-sensitive device, said lever serving to move said member when a predetermined Mach number is attained by said vehicle.

4. For use in an airborne vehicle, apparatus sensitive to Mach number and arranged to impart movement to a member when a predetermined Mach number is attained, said apparatus comprising an inlet for entry of a stream of air at ram pressure to the interior of said housing, a restriction associated with said inlet, an outlet for permitting said stream of air to flow from said housing, a restriction associated with said outlet, a manually adjustable needle for varying the effective area of one of said restrictions and thereby varying the pressure of said airstream in the interior of the housing, an evacuated capsule within said housing and exposed to the pressure of said airstream, a pressure-sensitive device of larger area than said capsule also disposed within said housing and having a surface facing said capsule exposed to the pressure of said airstream and a surface remote from said capsule exposed to static air pressure, and means rigidly coupling said capsule to said pressure-sensitive device.

5. For use in controlling the supply of fuel to the engine of an airborne vehicle, apparatus comprising, in combination with a conduit for the passage of a stream of air at ram pressure, said conduit containing a restriction, a housing, a passage of restricted cross section for inlet of air from a location upstream of said restriction to the interior of said conduit, another passage also of restricted cross section for the outlet of air from the interior of said housing, means for adjusting the effective area of one of said passages and thereby varying the pressure of the air flowing through the interior of said housing, an outlet duct connected to said conduit at a point downstream of the restriction therein, a valve disposed in said housing and normally closing said outlet duct, a lever within said housing, said lever being pivoted at one end to said housing and connected at its other end to said valve, an evacuated capsule within said housing which is exposed to the air pressure within the housing and is fixed to one side of said lever, and a pressure-sensitive device, of larger area than said capsule, also disposed within the housing and fixed to the opposite side of said lever, said pressure-sensitive device having a surface facing the capsule and opposed to the air pressure within the housing and a surface remote from the capsule exposed to static air pressure and serving to actuate said lever to open said valve when said vehicle attains a predetermined Mach number.

References Cited in the file of this patent

UNITED STATES PATENTS

| | | |
|---|---|---|
| 2,629,569 | Andrews | Feb. 24, 1953 |
| 2,642,237 | Page | June 16, 1953 |
| 2,645,240 | Drake | July 14, 1953 |